United States Patent
Sdahl et al.

(10) Patent No.: US 8,596,699 B2
(45) Date of Patent: Dec. 3, 2013

(54) GRIPPING DEVICE

(75) Inventors: Michael Sdahl, Ottobeuren (DE); Johannes Mühlschlegel, Aitrach (DE)

(73) Assignee: Multivac Sepp Haggenmueller GmbH & Co. KG, Wolfertschwenden (DE)

( * ) Notice: Subject to any disclaimer, the term of this patent is extended or adjusted under 35 U.S.C. 154(b) by 0 days.

(21) Appl. No.: 13/396,282

(22) Filed: Feb. 14, 2012

(65) Prior Publication Data
US 2012/0205929 A1 Aug. 16, 2012

(30) Foreign Application Priority Data

Feb. 15, 2011 (DE) .......................... 10 2011 011 255

(51) Int. Cl.
*B25J 15/12* (2006.01)

(52) U.S. Cl.
USPC .......... 294/207; 294/99.1; 294/196; 294/902; 901/37; 901/49

(58) Field of Classification Search
USPC ........ 294/99.1, 119.1, 196, 207, 902; 901/37, 901/39, 45, 49; 269/224, 254 R
See application file for complete search history.

(56) References Cited

U.S. PATENT DOCUMENTS

| | | | | |
|---|---|---|---|---|
| 3,788,692 A * | 1/1974 | Fischer | .................. | 294/100 |
| 4,447,048 A * | 5/1984 | Fischer | .................. | 267/141.1 |
| 4,478,089 A * | 10/1984 | Aviles et al. | .............. | 73/862.044 |
| 4,537,557 A * | 8/1985 | Whitney | .................. | 414/735 |
| 4,540,211 A * | 9/1985 | Masserang | .................. | 294/195 |
| 5,046,773 A * | 9/1991 | Modesitt | .................. | 294/100 |
| 5,118,154 A * | 6/1992 | Assalita et al. | .............. | 294/86.4 |
| 5,458,385 A * | 10/1995 | Peeples | .................. | 294/100 |
| 5,577,785 A * | 11/1996 | Traber et al. | .................. | 294/100 |
| 6,174,011 B1 * | 1/2001 | Keigler | .................. | 294/99.1 |
| 7,789,443 B2 * | 9/2010 | Gillespie et al. | .............. | 294/106 |
| 8,172,290 B2 * | 5/2012 | Nishino et al. | .............. | 294/99.1 |
| 8,424,940 B2 * | 4/2013 | Sarda | .................. | 294/99.1 |
| 2003/0107227 A1 * | 6/2003 | Nagler | .................. | 294/64.1 |

FOREIGN PATENT DOCUMENTS

| | | |
|---|---|---|
| DE | 214565 A1 | 10/1984 |
| DE | 276256 A1 | 2/1990 |
| DE | 289993 A5 | 5/1991 |

OTHER PUBLICATIONS

German Official Communication Dated Jun. 15, 2011, Applicant MULTIVAC Sepp Haggenmueller GmbH & Co. KG, Application No. 10 211 011 255.3.

* cited by examiner

*Primary Examiner* — Dean Kramer
(74) *Attorney, Agent, or Firm* — Husch Blackwell LLP

(57) ABSTRACT

A gripping device comprising holders which exhibit a two-directional elasticity for picking up products with large dimensional tolerances. The gripping device may comprise two grippers disposed in opposed relationship with one another. At least one of the grippers may be movable towards the other. Each of the grippers may include a holder and a gripping jaw attached to the holder. The holder may be a C-shaped portion that exhibits a two-directional elasticity to allow horizontal as well as a vertical movement of the gripping jaw. At least one of the holders may be coupled to a linear actuator to move the gripper in at least a substantially horizontal direction.

18 Claims, 4 Drawing Sheets

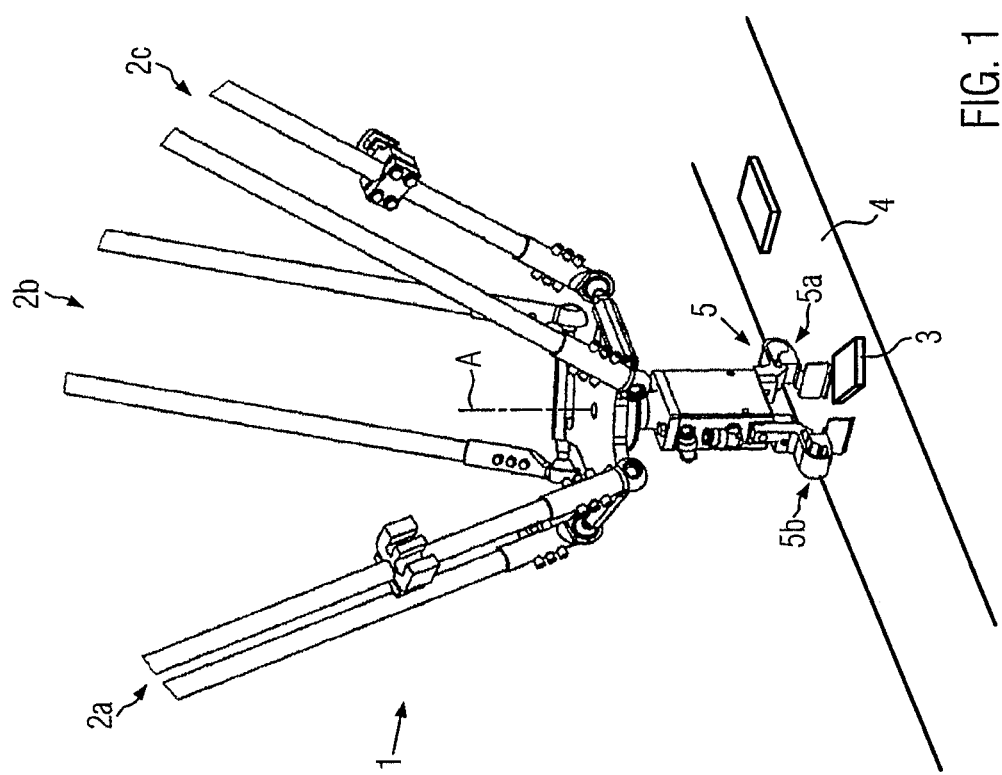

GRIPPING DEVICE

CROSS-REFERENCE TO RELATED APPLICATIONS

This application claims foreign priority benefits under 35 U.S.C. §119(a)-(d) to German patent application number DE 10 2011 011 255.3, filed Feb. 15, 2011, which is incorporated by reference in its entirety.

TECHNICAL FIELD

The disclosure relates to a gripping device.

BACKGROUND

Such gripping devices are used in the field of logistics and in particular in the field of the packaging industry for picking up and relocating products (e.g., food products).

SUMMARY

It is an object of the present disclosure to provide a gripping device which, on the one hand, is able to pick up products having large tolerances in the dimensions on the side to be picked up and which, on the other hand, prevents damage to the gripping device if it should collide vertically with a conveyor belt.

A gripping device according to the present disclosure comprises two grippers disposed in opposed relationship with one another and adapted to be moved towards one another, each of said grippers comprising a holder and a gripping jaw attached thereto. The gripping device is characterized in that the holder exhibits a two-directional (or two-axial) elasticity to allow a horizontal as well as a vertical movement of the gripping jaw relative to the holder. Within the framework of the elastic deformation of the holder, products with large tolerance differences can be picked up by the gripping device and, if the gripping jaws should touch down on the conveyor belt, the force acting on the gripping device can be minimized to thus prevent damage to the gripping jaws and holders.

The holder may be implemented as an integral component so that it can be produced by a cost efficient manufacturing process, such as water jet cutting, and so that it will be hygienic, since no unnecessary contact and mounting points exist within the holder or on the holder.

The holder is preferably made of POM (polyoxymethylene), since this is a material that is allowed to come into contact with food and since the gripping device can therefore be used in the food industry. Alternatively, the holder may be made of any suitable material. In that regard, stainless steel, by way of example, may be used as a material instead of POM.

The holder may be provided with a stop for horizontal movements, since the elasticity in the holder prevents overshooting, which may occur due to the high accelerations of the gripping device and the inertia of the gripping jaws attached to the holder. The holder may also be provided with a stop for vertical movements. Such continuously alternating vibrations having a large uncontrolled amplitude may otherwise cause damage to the holder if they occur over a prolonged period of time.

The holder may have a C-shaped exterior area or portion to allow a two-axis movement in a simple structural design.

Each holder may have the same spring force to guarantee a symmetric horizontal movement of two opposed holders.

The gripping jaw may be adapted to be adjusted relative to the holder so that the gripping device can be adapted to various dimensions of the products in question. The opening and closing movement can be implemented between two end positions of an actuating drive in a simple structural design.

According to one embodiment, the gripping jaws have a substantially perpendicularly oriented contact surface, two gripping jaws, which act relative to one another, being provided for picking up a product by means of frictional engagement. The distance between the individual products on the conveyor belt may therefore be very small, since the gripping jaws only require very little space due to the fact that they are vertically implemented. This implementation is also advantageous for depositing products, e.g., in a packaging trough.

The grippers may be adapted to be moved (e.g., automatically) away from and towards one another by means of an adjustment device, such as a pneumatic cylinder. The pneumatic cylinder is a structurally simple and cost efficient embodiment and has two end positions, which are provided as end positions of the opening and closing movement of the grippers.

The displacement speed and/or power of the pneumatic cylinder are preferably adjustable, e.g., by means of a proportional valve and/or a pressure reducing valve. The gripping device can thus flexibly be adjusted to various product characteristics. The valve adjustments carried out by an operator at a control unit can be stored in association with a product in a recipe memory in said control unit.

The gripping device may be provided on a handling unit, e.g., a robot. This allows a large amount of products to be picked up per unit time.

According to one embodiment, the handling unit is a two-, three- or four-axis robot. A four-axis robot offers the possibility of picking up products at different rotary positions and putting them down at a specific rotary position.

In the following, an advantageous embodiment of the present disclosure is explained in more detail with reference to the below drawings.

BRIEF DESCRIPTION OF THE DRAWINGS

FIG. 1 is a schematic view of a four-axis robot with a gripping device.

DETAILED DESCRIPTION

Figure 3:
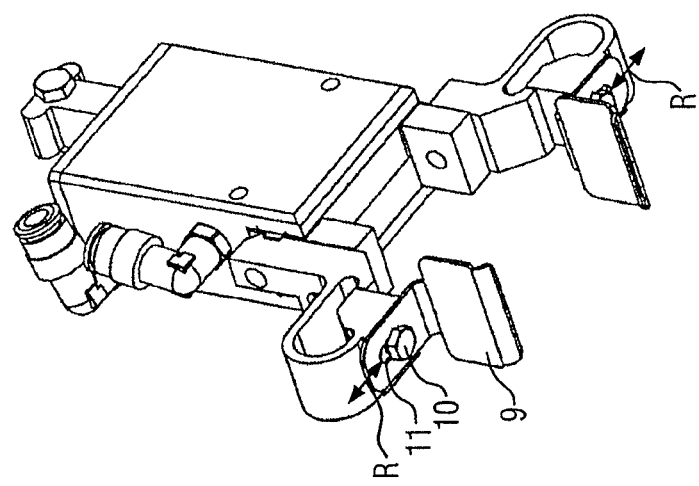
FIG. 3 is a schematic view of a gripping device from below.

Identical components are designated by identical reference numerals throughout the figures.

FIG. 1 shows a four-axis robot 1 comprising three pairs of arms 2a, 2b, 2c and a fourth pivot axle, which is not shown and which pivots a gripping device 5 about an axis A so as to adapt the gripping device 5 to a product 3 conveyed by means of a conveyor belt 4 into the area of the four-axis robot 1. By means of two grippers 5a, 5b on the gripping device 5 the product 3 is gripped on two sides thereof and picked up from the conveyor belt 4. The grippers 5a, 5b are supported on a support body B of the gripping device 5 such that the grippers 5a, 5b are movable with respect to the support body B.

Figure 2:
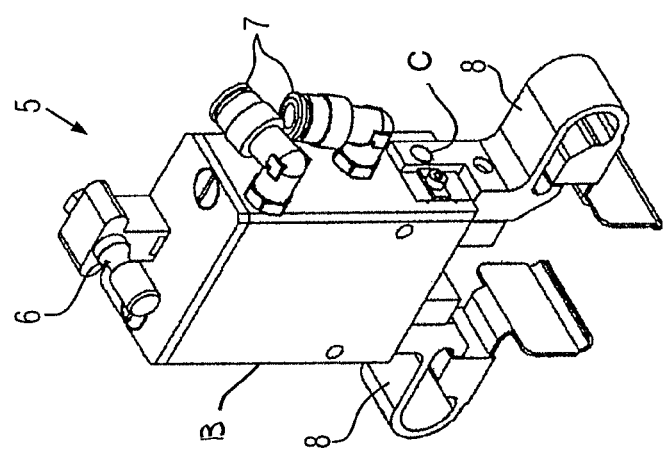
FIG. 2 is a schematic view of a gripping device from above.

FIG. 2 shows the gripping device 5 with a reception means 6 for adaptation to the four-axis robot 1. Connections 7 serve to supply fluid for operating the cylinder C in the interior of the gripping device 5 (e.g., interior of the support body B), said cylinder C being not shown in detail. Two elastic holders 8 are provided on both sides of the cylinder C.

FIG. 3 shows that, mounted on a respective holder 8 of a gripper 5a, 5b, the gripping jaws 9 are adjustable in the direction of movement R by means of a screw connection 10 via a slotted link 11 provided in the gripping jaws 9.

Figure 4:
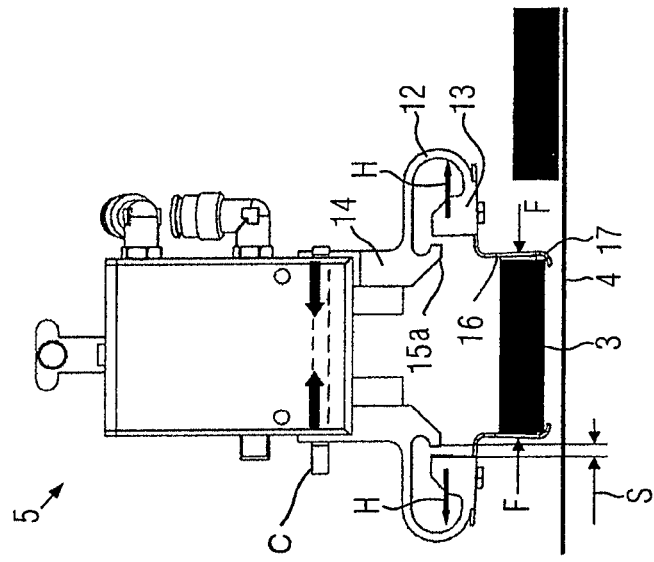
FIG. 4 is a front view of a gripping device with a product.

This elastic holder 8 is now explained in more detail making reference to FIG. 4. The holder 8 has in the exterior area 12 a small wall thickness and a substantially C-shaped configuration. The gripping jaw 9 is attached to a movable end 13 of the holder 8. When the product 3 is gripped on both sides by means of the gripping jaws 9, the cylinder C moves the holders 8 towards one another until an end position is reached. The gripping jaws 9 are adjusted relative to the holders 8 (e.g., portions 14 of holders 8) and the support body B such that a horizontal movement H of the end 13 and an elastic deformation of the holder 8 are caused, whereby a spring force is produced. This spring force produces a holding force F acting on the product 3 via the contact surfaces 16 of the gripping jaws 9. This leads to a frictional engagement between the product 3 and the gripping jaws 9. A gap S is created between the end 13 and a stop 15a of the holder 8. The force F depends on the bias of the holders 8, which is influenced by the end position of the cylinder C and the adjustment of the gripping jaws 9 relative to the holders 8. The stop 15a serves to limit the horizontal movement H in one direction. The amplitude of vibrations of the end 13 is to be limited in this way in the horizontal direction. The high accelerations and the inertia of the gripping jaw 9 would otherwise cause vibrations which, if large vibration amplitudes occurred over a prolonged period of time, would cause damage to the holder 8. The contact surface 16 of the gripping jaw 9 is configured such that it is vertical to a very large extent. On the lower end of the contact surface 16 a chamfer 17 is provided, which, on the one hand, guarantees that the product is supported on two sides and, on the other hand, comprises an area that is obtuse relative to the conveyor belt 4 so as to exclude or at least minimize damage that may be caused when the gripping jaw 9 comes into contact with the conveyor belt 4.

Figure 5:
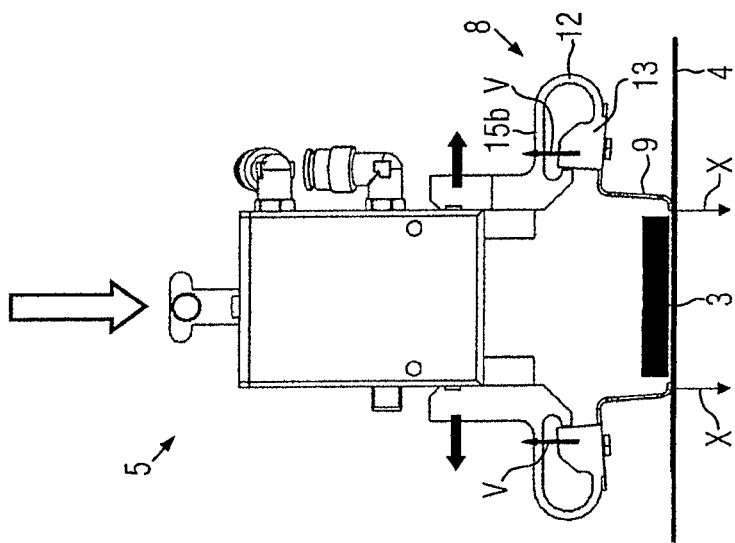
FIG. 5 is a front view of a gripping device in contact with a conveyor belt.

FIG. 5 shows the gripping device 5 at an open end position at which the pneumatic cylinder C moves the holders 8 and the gripping jaws 9 away from each other at least to such an extent that the product 3 can be taken hold of. The cylinder C may be provided with limit switches through which the end positions can be adjusted. For picking up the product 3, the gripping device 5 must be moved downwards as far as possible towards the conveyor belt 4. If, in the course of this process, the gripping jaws 9 should touch down on the conveyor belt 4 and a vertical movement V should consequently take place, the gripping jaws 9 will force the ends 13 of the holders 8 upwards. Due to the elastic deformation in the exterior area 12, this will only result in a minor force X with which the gripping jaws 9 rest on the conveyor belt 4, which may e.g., be moving. This minor force X is produced by the bias in the holder 8 and causes neither any damage to the gripping device 5 nor any damage to the conveyor belt 4. A movement V produced by vibrations during the movements of the gripping device 5 is limited by a stop 15b of the holder 8.

Figure 6:
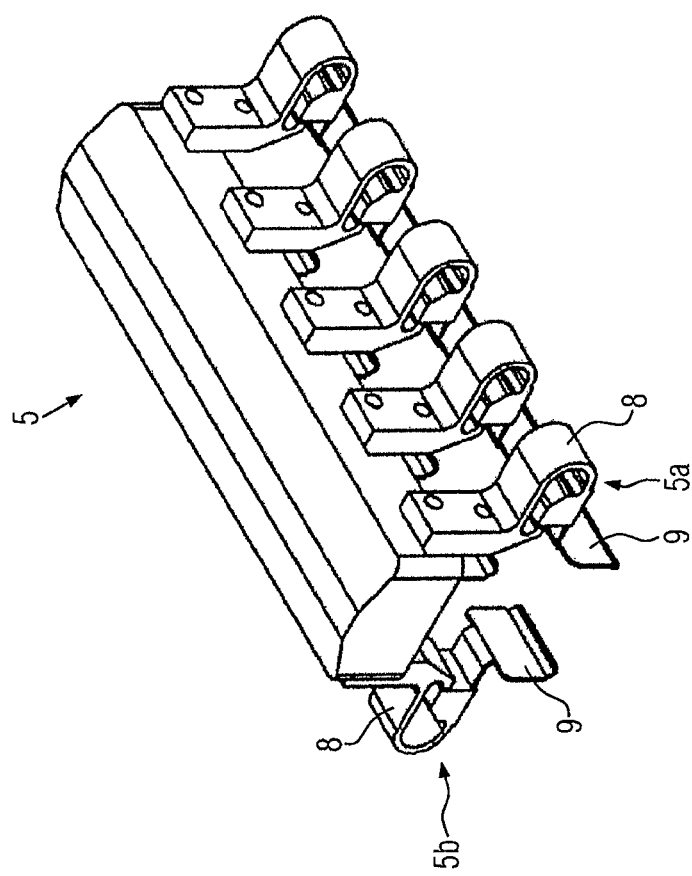
FIG. 6 is a schematic view of an alternative gripping device.

Also variants are imaginable in the case of which several holders 8 are provided on a cylinder of a gripping device 5, or a gripping device 5 is provided with several cylinders, as shown in FIG. 6, having holders 8 provided thereon for simultaneously picking up comparatively long products (e.g., fillets of fish) or a plurality of products 3, e.g., five pairs of grippers 5a and 5b which are disposed in opposed relationship with one another.

Within the scope of the present disclosure the terms "horizontal movement" and "vertical movement" are to be interpreted in the sense that also any pairs of movements taking place perpendicular to one another are meant. A horizontal movement is therefore a first movement in the first direction, whereas a vertical movement is a second movement in a second direction perpendicular to the first direction. The gripping device 5 may thus especially also be tilted so that, although a first direction of movement of the gripping jaws 9 is a horizontal direction, a second movement of the gripping jaws 9 will not take place in a precisely vertical direction, but in a direction which is directed at an oblique angle upwards but is nevertheless perpendicular to the first, horizontal movement.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A gripping device comprising:
   two grippers disposed in opposed relationship with one another and adapted to be moved towards one another, each of said grippers including a holder and a gripping jaw attached thereto, wherein for each gripper, the holder has a C-shaped portion that exhibits a two-directional elasticity to allow a horizontal as well as a vertical movement of the gripping jaw;
   wherein each of said holders of said grippers include a first end and a second end, the first end of each of said holders operably connected to one of said gripping jaws and the second end of at least one of said holders being coupled to a linear actuator to move said gripper in at least a substantially horizontal direction.

2. A gripping device according to claim 1 wherein each holder is implemented as an integral component.

3. A gripping device according to claim 1 wherein each holder is made of polyoxymethylene.

4. A gripping device according to claim 1 wherein each holder is provided with a stop for limiting the horizontal movement and/or the vertical movement.

5. A gripping device according to claim 1 wherein each holder has a spring constant, and the spring constants are the same.

6. A gripping device according to claim 1 wherein, for each gripper, the gripping jaw is adapted to be adjusted relative to the holder.

7. A gripping device according to claim 1 wherein each gripping jaw has a substantially perpendicularly oriented contact surface, and the gripping jaws act relative to one another for picking up a product by means of frictional engagement.

8. A gripping device according to claim 1 wherein the linear actuator is a pneumatic cylinder for moving the grippers away from and towards one another.

9. A gripping device according to claim 8 wherein displacement speed and/or power of the pneumatic cylinder can be adjusted.

10. A gripping device according to claim 1 further comprising a handling unit on which the grippers are supported.

11. A gripping device according to claim 10 wherein the handling unit is a two-, three- or four-axis robot.

12. A gripping device according to claim 1 wherein said C-shaped portion includes a first end section and a second end section wherein said first and second end sections are substantially parallel prior to any horizontal or vertical movement of said gripping jaw.

13. A gripping device comprising:
a support body; and
two grippers supported by the support body and disposed in opposed relationship, wherein at least one of the grippers is adapted to be moved toward another of the grippers, and each of the grippers includes a holder and a gripping jaw attached to the holder, and wherein for each gripper, the holder has a C-shaped portion that provides a two-directional elasticity to allow movement of the gripping jaw in two perpendicular directions relative to the support body;
wherein each of said holders of said grippers include a first end and a second end, the first end of each of said holders operably connected to one of said gripping jaws and the second end of at least one of said holders being coupled to a linear actuator to move said gripper in at least a substantially horizontal direction.

14. A gripping device according to claim 13 wherein each holder is provided with at least one stop for limiting movement of the respective gripper jaw in at least one of the two directions.

15. A gripping device according to claim 13 wherein, for each gripper, the gripping jaw is adapted to be adjusted relative to the holder.

16. A gripping device according to claim 13 wherein each gripping jaw has a substantially planar contact surface and an angled portion extending from a lower end of the contact surface, and the gripping jaws act relative to one another for picking up a product.

17. A gripping device according to claim 13 further comprising a handling unit on which the support body is supported.

18. A gripping device according to claim 17 wherein the handling unit is a two-, three- or four-axis robot.

* * * * *